United States Patent [19]

Crema

[11] Patent Number: 4,609,477

[45] Date of Patent: Sep. 2, 1986

[54] LIQUID FOAMING ADDITIVES USED IN THE STIMULATION OF OIL AND GAS WELLS

[75] Inventor: Stefano C. Crema, Wyandotte, Mich.

[73] Assignee: BASF Corporation, Wyandotte, Mich.

[21] Appl. No.: 698,349

[22] Filed: Feb. 5, 1985

[51] Int. Cl.⁴ ............................................. E21B 43/26
[52] U.S. Cl. .................................. 252/8.55; 166/308; 252/307
[58] Field of Search .......... 252/8.5 C, 8.55 R, 8.55 C, 252/3, 307

[56] References Cited

U.S. PATENT DOCUMENTS

| | | | |
|---|---|---|---|
| 3,829,506 | 8/1974 | Schmolka et al. | 252/307 X |
| 3,937,283 | 2/1976 | Blauer et al. | 252/8.55 X |
| 4,440,653 | 4/1984 | Brisco et al. | 252/8.55 |
| 4,460,791 | 7/1984 | Cooke | 568/45 |

FOREIGN PATENT DOCUMENTS

WO82/01007 4/1982 PCT Int'l Appl. ................ 526/243

*Primary Examiner*—Herbert B. Guynn
*Attorney, Agent, or Firm*—Joseph D. Michaels

[57] ABSTRACT

This invention relates to a liquid foaming additive comprising
(a) a nonionic fluorochemical surfactant; and
(b) a nonionic heteric polyether surfactant having at least two additive hydrogen atoms wherein components (a) and (b) are used in an effective amounts.

The foaming additives are used to foam lower alkyl alcohols which are injected into oil and gas wells to break up underground formations which trap the oil and gas.

9 Claims, No Drawings

LIQUID FOAMING ADDITIVES USED IN THE STIMULATION OF OIL AND GAS WELLS

BACKGROUND OF THE INVENTION

1. Field of the Invention

This invention relates to liquid foaming additives used in the stimulation of oil and gas wells. The foaming additives comprise (a) a nonionic fluorochemical surfactant; and (b) a nonionic heteric polyether surfactant having at least two active hydrogen atoms.

2. Description of the Prior Art

It is known to use nonionic fluorochemical surfactants to foam lower alkyl alcohols in order to stimulate oil and gas well production. The basis for the process is that injection of the foam causes the underground formations, which are holding back the oil and gas, to break or fracture and allow the oil and gas to be released and recovered.

The problem with using nonionic fluorochemical surfactants, however, is that they are quite expensive relative to other nonionic surfactants. Consequently, researchers in the oil and gas industry, and the surfactant industry, have looked for other nonionic surfactants which could be used with fluorochemical surfactants that would reduce the cost of the foaming additive without adversely affecting the effectiveness of the foaming additive.

One type of nonionic surfactant now used in the field in conjunction with the nonionic fluorochemical surfactants is the block copolymer of an initiator having more than two active hydrogen atoms formed by the block addition ethylene oxide and propylene oxide.

Although these nonionic surfactants are effective in field use, they are solids at use temperature and must be heated in order to mix effectively with the fluorochemical surfactant and the lower alkyl alcohol to be foamed.

SUMMARY OF THE INVENTION

This invention relates to a liquid foaming additive comprising
  (a) a nonionic fluorochemical surfactant; and
  (b) a nonionic heteric polyether surfactant having at least two active hydrogen atoms wherein components (a) and (b) are used in an effective amounts.

The foaming additives are used to foam lower alkyl alcohols which are injected into oil and gas wells to fracture underground formations which trap the oil and gas.

The data herein will show that the use of the nonionic heteric polyether surfactant in the foaming additives has two advantages over the nonionic block copolymers known in the art. These are that the nonionic heteric polyether surfactant is liquid, and it will result in greater foam half-life. Consequently, one can achieve the same result as with the nonionic block copolymer surfactant, but with less surfactant.

DESCRIPTION OF THE PREFERRED EMBODIMENTS

The fluorochemical surfactants which are used in the subject foam additives are nonionic fluorochemical surfactants. The chemical structure of such surfactants varies greatly, but all these surfactants are similar in that they contain a hydrophobic-olephobic fluoroaliphatic segment bonded to a segment containing one or more hydrophilic and/or hydrophobic-olephilic segments. Such surfactants are well known, and are sold by 3M Corporation under the FLUORAD ® trademark and by E. I. duPont de Nemours & Company under the ZONYL ® trademark. Examples of useful fluorochemical nonionic surfactants are described in U.S. Pat. Nos. 4,440,653; 3,792,977; 4,213,870; 4,460,791; and published PCT application No. WO 8201007-A all of which are hereby incorporated by reference. Of particular interest are the surfactant described in the published PCT application which are oligomers containing perfluorinated and carboxyl groups.

The nonionic heteric polyether surfactants having at least two active hydrogen atoms are prepared by methods well known in the art. Essentially, an initiator having at least two active hydrogen atoms is reacted with a mixture of ethylene oxide and a lower epoxide having 3 to 4 carbon atoms such as propylene oxide or butylene oxide at increased temperatures in the presence of an oxyalkylation catalyst wherein the weight ratio of ethylene oxide to lower alkylene oxide is from 80:20 to 20:80.

Representative examples of initiators having more than two active hydrogen atoms include ethylene glycol, propylene glycol, glycerine, trimethyol propane, ethylene diamine, N,N'-tetrakis(2-hydroxypropyl)ethylenediamine, pentaerithrytol, and sorbitol.

The average molecular weight of the nonionic heteric polyether surfactant is between 5,000 to 50,000, preferably, 10,000 to 30,000.

The components of the foaming additive are used in effective amounts. From a commercial viewpoint, it is better to use as much of the nonionic heteric polyether surfactant as possible because it is less costly. In general, the weight ratio of nonionic fluorochemical surfactant to nonionic heteric polyether surfactant will range from 1:5 to 5:1.

In order to produce a foam which will break up the underground formations, which must be done in order to release the trapped oil and gas, the foaming additive is added to a lower alkyl alcohol such as methanol or isopropanol, or, more particularly, anhydrous methanol. The resulting mixture may also contain other components such as thickening and fluid loss reduction agents, sand or other suitable types of proppant. The amount of foaming additive to be used may vary over wide ranges. Enough should be added to produce a foam suitable for the stimulation of the underground formation which is trapping the oil and gas. However, large excesses are not economical. For most purposes, it can be said that the volume ratio of lower alkyl alcohol to foaming additive is from 100:0.5 to 100:6.

The Examples which follow will further illustrate the practice of this invention in more detail.

In the Examples which follow the following terms will identify the nonionic surfactants used:

HETERIC #1—a heteric copolymer having an average molecular weight of 18,600 prepared by reacting ethylenediamine with a 70:30 weight ratio of ethylene oxide and propylene oxide.

BLOCK #1—a block copolymer prepared as was HETERIC #1 except the oxides were added in sequence with the ethylene oxide being added first.

HETERIC #2—same as HETERIC #1 except the average molecular weight was 27,000 and the weight ratio of ethylene oxide to propylene oxide was 20:80.

BLOCK #2—same as HETERIC #2 except the ethylene oxide was added first, and then the propylene oxide was added.

HETERIC #3—a heteric copolymer having a molecular weight of 2,750 prepared by reacting propylene glycol with an 80:20 weight ratio of ethylene oxide to propylene oxide.

BLOCK #3—a block copolymer which is the same as HETERIC #3 except the oxides are added in sequence, with the ethylene oxide being added first.

HETERIC #4—same as HETERIC #1 except the weight ratio of ethylene oxide to propylene oxide was 60:40.

FLUOROCHEMICAL SURFACTANT—FLUORAD® FC-742 sold by 3M Corporation; this surfactant is a nonionic fluorochemical chemical surfactant having a Brookfield viscosity of 200 cp at 25° C., a specific gravity of 1.05 at 25° C., and a flash point of −9° C. and as further described in the product information bulletin by 3M Corporation related to FLUORAD® Well Stimulation Additive FC-742, published in 1982 belonging to the chemical class of fluorinated alkyl esters.

EXAMPLES

Several solutions were prepared by combining 5 ml parts by volume of FLUOROCHEMICAL SURFACTANT and 20 grams of either a HETERIC or BLOCK nonionic polyoxyalkylene surfactant with 1,000 ml of anhydrous methanol. The specific HETERIC or BLOCK surfactant used is set forth in the table.

Then 200 ml of these solutions were mixed with a Hobart N-50 food mixer in a mixing pan at 300 rpm for five minutes. The contents of the mixing pan were then poured into a 2000 ml graduate, and the foam height (ml) was recorded. The quality was calculated as follows:

Foam quality=(foam height−200 ml/foam height)×100.

The half-life of the foam ($t_{\frac{1}{2}}$) is the time required for the liquid in the graduate to drain from the foam to the 100 ml mark of the graduate.

The results of the experiments with various foaming additives are recorded in the table.

TABLE

| Polyoxyalkylene Surfactant | Foam Quality | Foam Half-Life (sec.) |
|---|---|---|
| HETERIC #1 | 85.07 | 162 |
| BLOCK #1 | 81.63 | 131 |
| HETERIC #2 | 85.57 | 187 |
| BLOCK #2 | 81.00 | 140 |
| HETERIC #3 | 84.25 | 165 |
| BLOCK #3 | 80.93 | 100 |
| HETERIC #4 | 84.58 | 142 |

The data indicate that when a heteric nonionic polyoxyalkylene surfactant is used with the subject fluorochemical surfactant instead of block nonionic polyoxyalkylene surfactant, the foam quality and half-life of the foamed solution are improved. Consequently, it is possible to use less co-surfactant if the heteric nonionic surfactant is used instead of the block nonionic surfactant. It should also be noted that all of the heteric nonionic polyoxyalkylene surfactants were liquid while the block nonionic polyoxyalkylene surfactants were solid.

The embodiments of the invention in which an exclusive privilege or property is claimed are defined as follows:

1. A foaming additive for the stimulation of oil or gas wells comprising:
   (a) a nonionic fluorochemical surfactant; and
   (b) a nonionic heteric polyether surfactant having a molecular weight of 5,000 to 50,000 prepared by reacting an initiator having at least two active hydrogen atoms with a mixture consisting of of ethylene oxide and a lower epoxide having 3 to 4 carbon atoms such that the weight ratio of ethylene oxide to lower epoxide is from 80:20 to 20:80 wherein components (a) and (b) are used in a weight ratio of 1:5 to 5:1.

2. The foaming additive of claim 1 wherein the fluorochemical surfactant is fluorinated alkyl ester.

3. The foaming additive of claim 1 wherein the heteric nonionic polyether surfactant has an average molecular weight of 5,000 to 30,000.

4. The foaming additive of claim 3 wherein the lower epoxide is propylene oxide.

5. The foaming additive of claim 4 wherein the initiator used to prepare the heteric polether nonionic surfactant is selected from the group consisting of ethylenediamine, ethylene glycol, propylene glycol, dipropylene glycol, trimethyolpropane, and glycerine.

6. A process for stimulating oil or gas well formations which comprises injecting an effective amount of a foaming additive comprising
   (a) a nonionic fluorochemical surfactant; and
   (b) a nonionic heteric polyether surfactant having a molecular weight of 5,000 to 50,000 prepared by reacting an initiator having at least two active hydrogen atoms with a mixture consisting of of ethylene oxide and a lower epoxide having 3 to 4 carbon atoms such that the weight ratio of ethylene oxide to lower epoxide is from 80:20 to 20:80 wherein components (a) and (b) are used in a weight ratio of 1:5 to 5:1
into the oil or gas well formation along with a lower alkyl alcohol which will foam in the presence of the foaming additive and fracturing said formation.

7. The process of claim 6 wherein the lower alkyl alcohol is anhydrous methanol.

8. The process of claim 7 wherein the nonionic fluorochemical surfactant is a fluorinated alkyl ester.

9. The process of claim 8 wherein the initiator used to prepare the heteric nonionic surfactant is selected from the group consisting of ethylenediamine, ethylene glycol, propylene glycol, dipropylene glycol, trimethyolpropane, and glycerine.

* * * * *